(12) United States Patent
Reed

(10) Patent No.: US 6,860,251 B1
(45) Date of Patent: Mar. 1, 2005

(54) ROTARY PISTON ENGINE

(76) Inventor: Tommey Reed, 1164 Balch Pl., Virginia Beach, VA (US) 23454

( * ) Notice: Subject to any disclaimer, the term of this patent is extended or adjusted under 35 U.S.C. 154(b) by 0 days.

(21) Appl. No.: 10/938,017

(22) Filed: Sep. 11, 2004

(51) Int. Cl.[7] .................................................. F02B 53/00
(52) U.S. Cl. ........................................................ 123/200
(58) Field of Search .............................. 123/200, 221, 123/223, 224, 225, 239

(56) References Cited

U.S. PATENT DOCUMENTS

| | | |
|---|---|---|
| 1,013,885 A | 1/1912 | McConnell |
| 1,132,928 A | 3/1915 | Gruzecki |
| 1,239,853 A | 9/1917 | Walter |
| 1,246,875 A | 11/1917 | Carpenter |
| 1,970,003 A | 8/1934 | Fenati |
| 2,069,557 A | 2/1937 | Policansky |
| 2,170,366 A | 8/1939 | Dominguez |
| 2,353,446 A | 7/1944 | Davidson |
| 2,760,466 A | 8/1956 | Black, Jr. |
| 3,897,758 A | 8/1975 | Humiston |
| 5,009,206 A | 4/1991 | Yi |
| 6,672,274 B2 | 1/2004 | Winterpacht |

*Primary Examiner*—Bibhu Mohanty
(74) *Attorney, Agent, or Firm*—Goldizen & Associates; Bradley D. Goldizen

(57) ABSTRACT

A rotary engine includes separate chambers for receiving pressurized air and fuel. An air chamber stories pressurized air that is routed into a combustion chamber to be mixed with fuel for combustion to drive a piston. The combustion chamber is forced open during a firing cycle to allow expanding gases into a piston chamber. A valve door serves as a base against which the expanding gases react to force a piston in a forward direction. The piston is coupled to a crank shaft which may in turn be coupled to a transmission or other power drive device to harness energy created by the turning crankshaft. A lifter includes a gear that rotates to raise and lower the valve door such that it moves towards and away from the crankshaft to optimize the amount of energy that is directed against the piston. Through series of multiplier gears, the amount of movement necessary to lift the door is minimal.

20 Claims, 28 Drawing Sheets

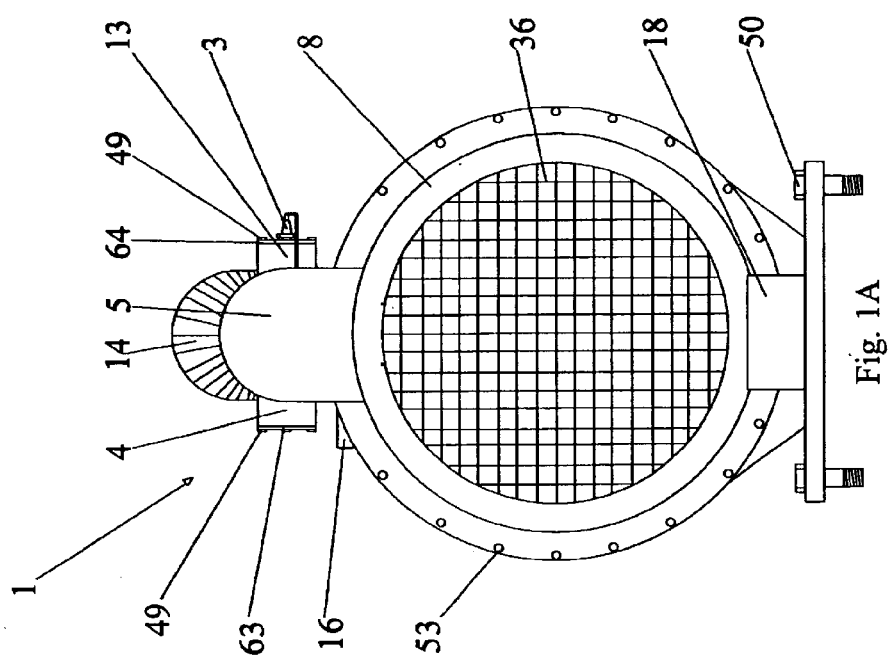

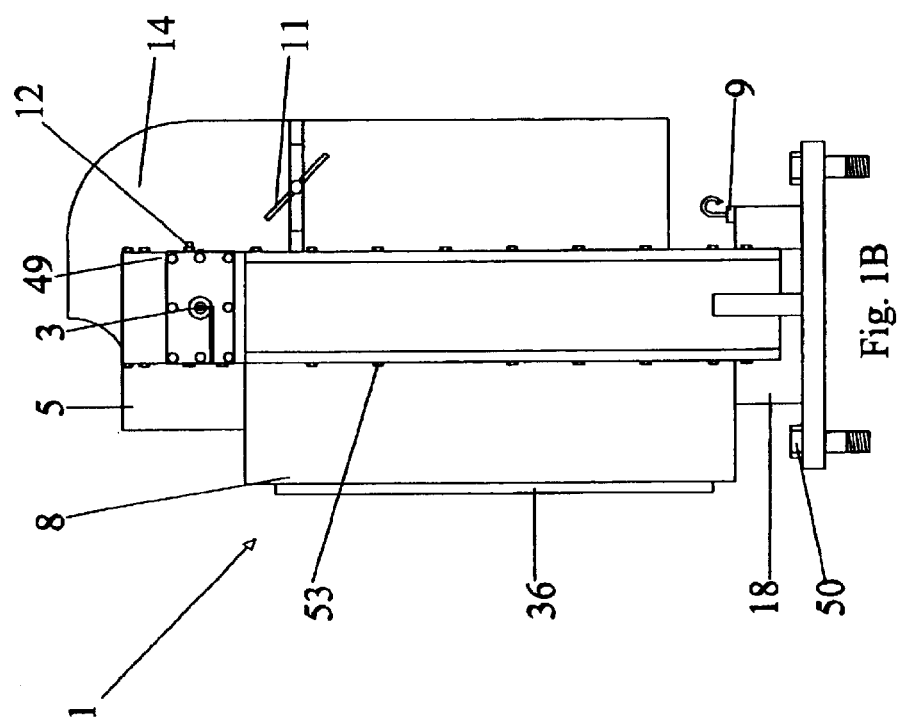

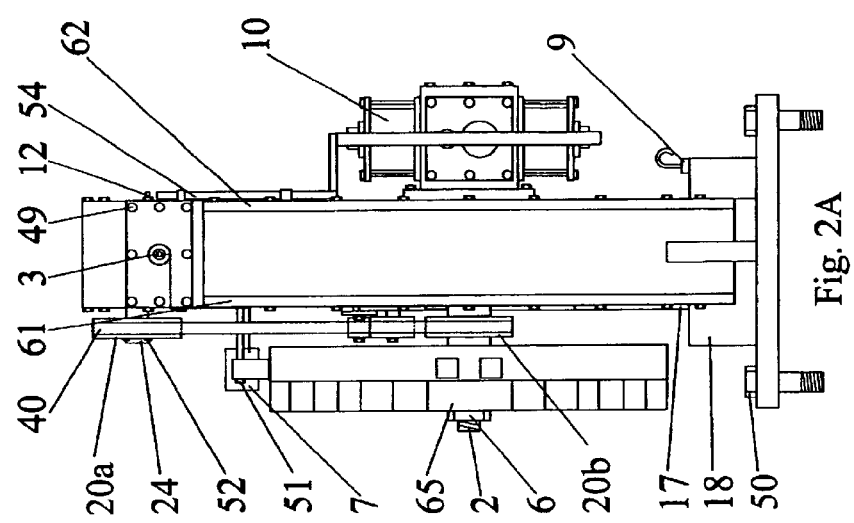

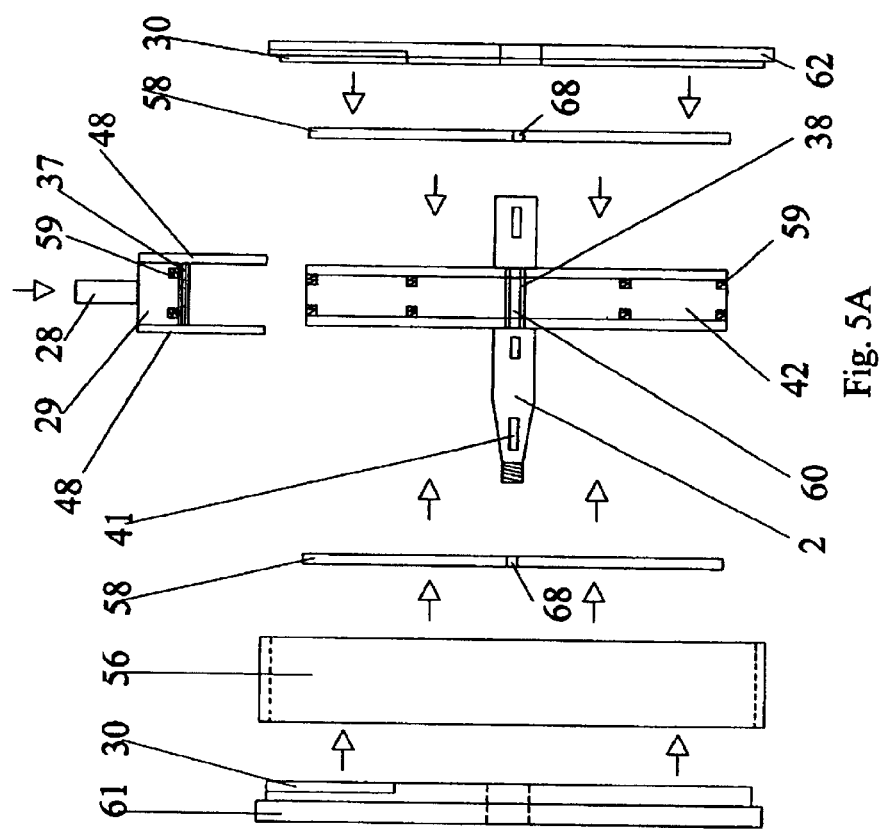

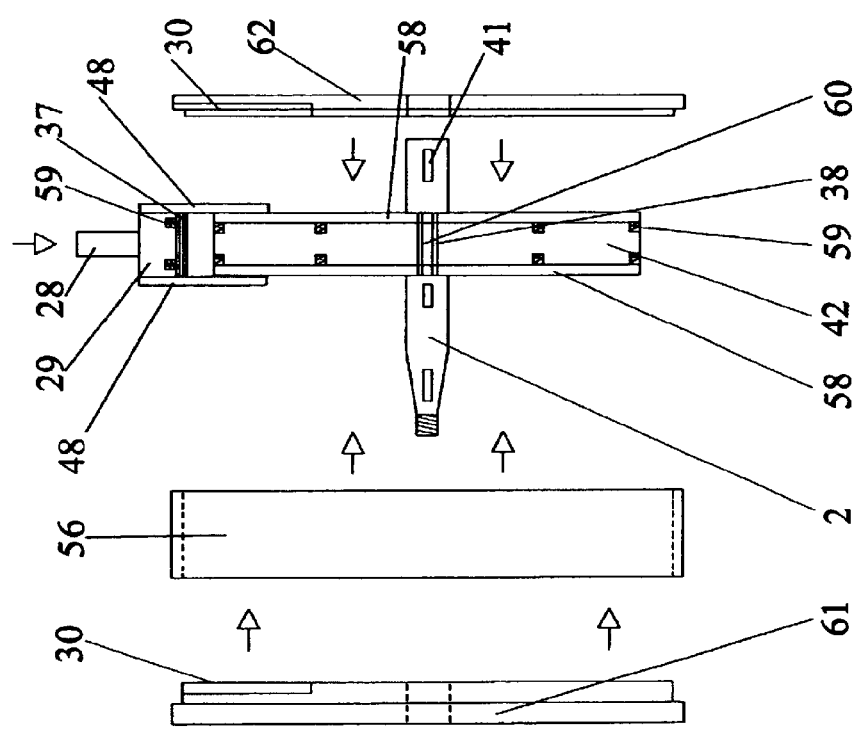

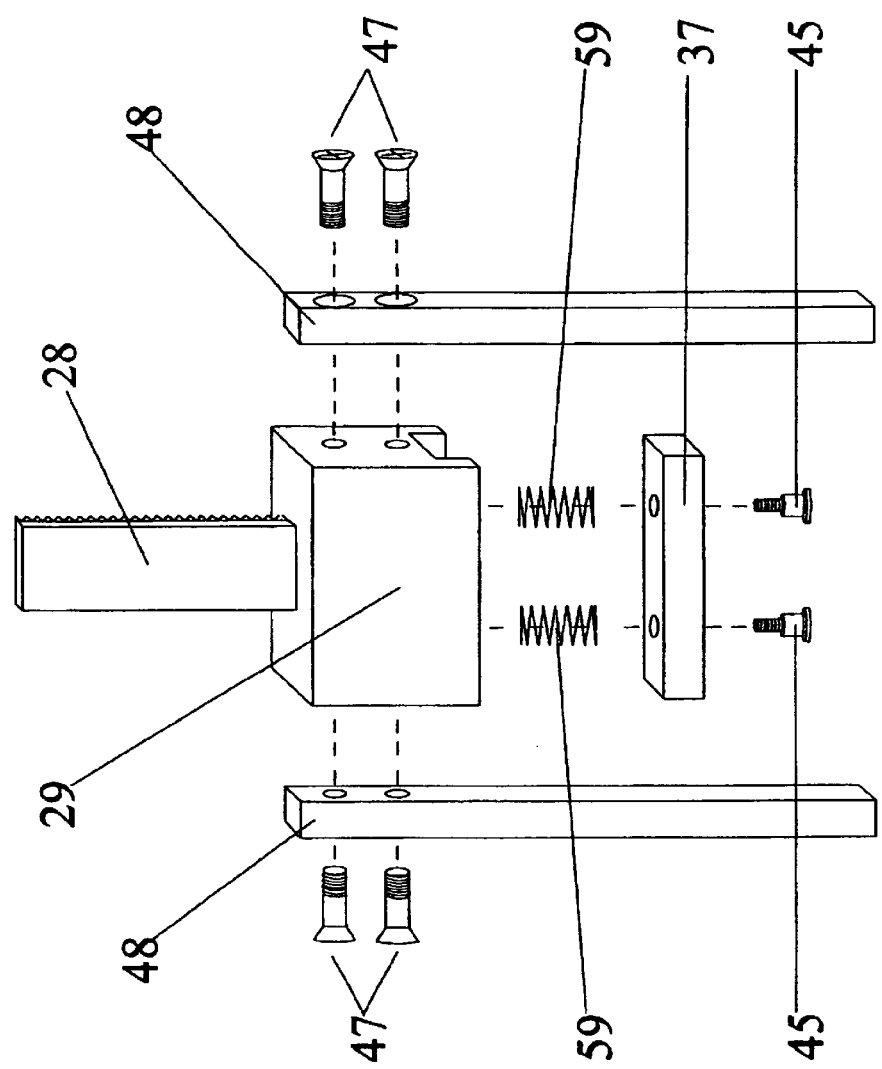

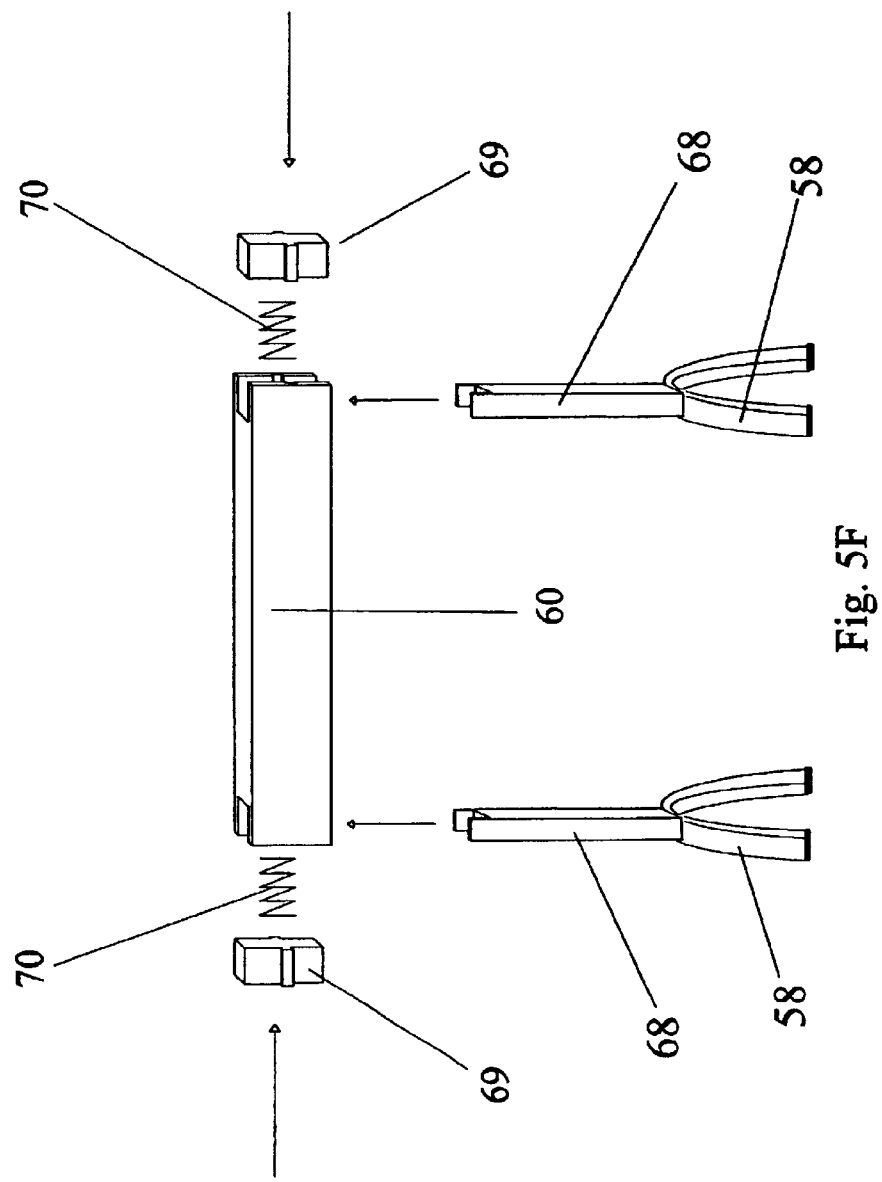

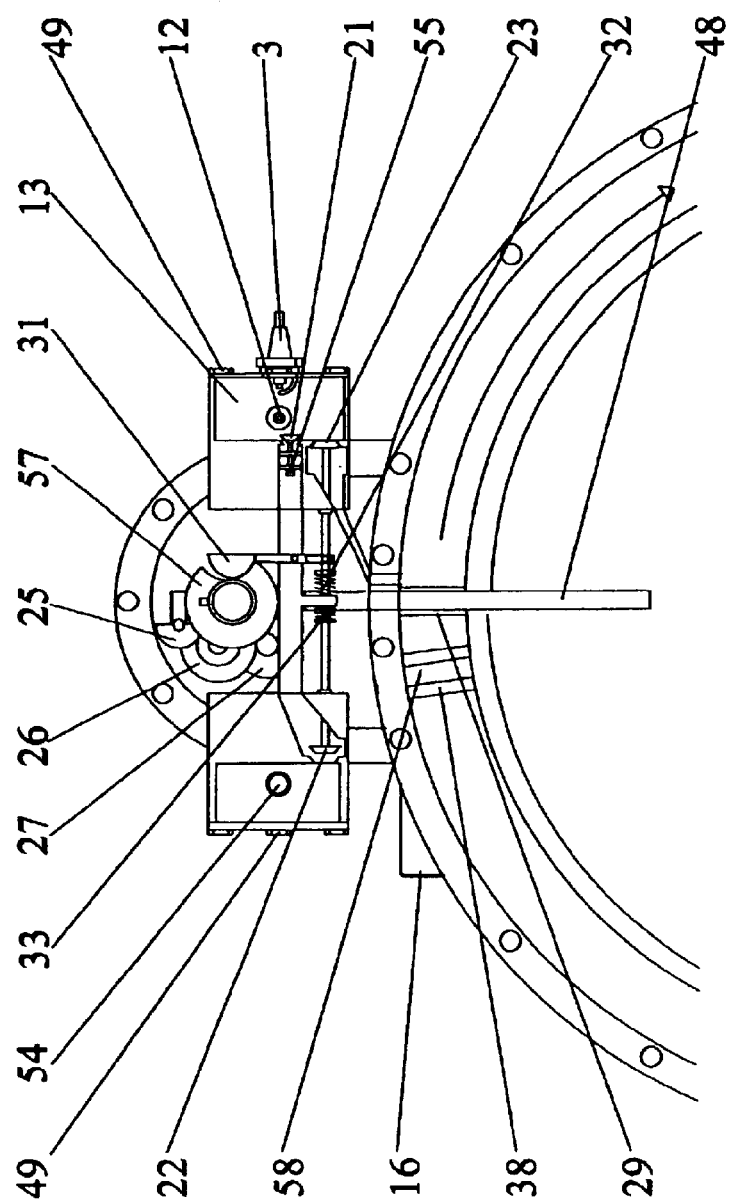

ROTARY PISTON ENGINE

There are no related patent applications.

This patent application did not receive any federal research and development funding.

BACKGROUND OF THE INVENTION

The invention generally relates to a rotary piston engine. More particularly, the invention relates to a rotary piston engine that includes an air chamber for storing pressurized air that is routed into a separate combustion chamber for ignition purposes. The engine includes a housing that surrounds at least one rotor coupled to a piston for driving a shaft that may be coupled to a drive assembly for harnessing rotational energy produced by the rotor. A movable valve door provides a base against which expanding gases react to force the piston in a forward direction. The valve door is drawn away from the shaft to allow the piston to pass-by to complete a revolution.

Internal combustion engines are typically referred to as either a reciprocating piston engine or a rotary piston engine. Reciprocating piston engines use crank gears to translate movement of pistons into a rotary motion. The use of crank gears in a rotary piston engine is unnecessary since the piston performs a rotary motion during operation.

The most popular rotary engine, the Wankle rotary engine, includes a piston having a cross-section similar to a triangle and rotates in a uniquely shaped cylinder. Because of the unique shape of the cylinder, it encounters sealing problems that result in high fuel consumption. Most known rotary piston engines are complex and require high production and maintenance costs.

It should be noted that the discussion of the rotary engine in the present invention is not limited to internal combustion engines. The present invention may be modified to be powered by air, geothermal energy or the like.

BRIEF SUMMARY OF THE INVENTION

The present invention is a rotary engine that includes separate air and fuel combustion chambers. Pressurized air is pumped into an air chamber that stores the air until completion of a firing cycle. The pressurized air is then routed into a combustion chamber and mixed with fuel to be combusted. Expanding gases from the combustion chamber are directed into a cylinder defined by a housing. A movable valve door provides a surface against which the gases react to force a piston and rotor around a crankshaft. The crankshaft may be coupled to a drive assembly for use in harnessing the energy produced by the engine.

The rotary engine includes a housing that defines a working cylinder in which a piston and rotor rotate. The piston and rotor are coupled to a crankshaft. A valve door is operablely disposed within the cylinder such that it is withdrawn from the cylinder to allow the piston to pass between the rotor and the valve door to complete a revolution. A lifter comprises a gear that is rotated in opposite directions to raise and lower the valve door such that it moves towards and away from the crankshaft to optimize the amount of energy that is directed against the piston. Through series of multiplier gears, the amount of movement necessary to lift the valve door is minimal.

It is an object of the invention to provide a rotary engine that has separate air pressurizing and fuel/air mixing chambers.

It is a further object of the invention to provide a rotary engine that includes a novel lifter mechanism for withdrawing a valve door from the working cylinder of the piston.

It is an additional object of the invention to provide a rotary engine that is high torque engine having greater fuel efficiency and less energy losses than rotary engines of the past.

It is another object of the invention to provide a simplified rotary engine that is less costly to produce and maintain while maximizing an amount of energy realized during combustion of fuel.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

BRIEF DESCRIPTION OF DRAWINGS

FIG. 1A is a front elevation view of the engine of the present invention and having protective shielding installed.

FIG. 1B is a side elevation view of the engine shown in FIG. 1A.

FIG. 2A is a right side elevation view of the engine shown with the protective shielding removed.

FIG. 5A is an exploded view of the rotor and rotor case components taken from the side.

FIG. 5B is a partial exploded view of the rotor and rotor case components shown in FIG. 5A. In this Figure, the rotor seal vane attaches to the rotor.

FIG. 5C is an exploded view of the valve door shown in FIG. 5B.

FIG. 5F is an exploded view of the vane seal for the top of the piston.

FIGS. 6A through 6D depict the timing rotation of the piston and valve system including valve door during one rotation of operation.

DETAILED DESCRIPTION OF THE INVENTION

Figure 2B:
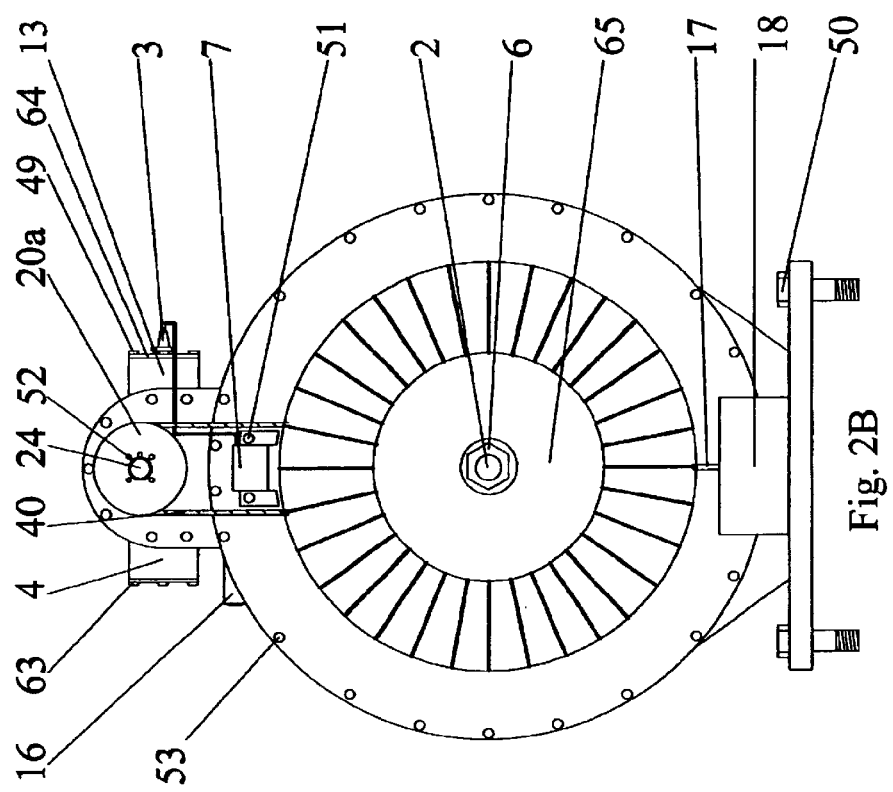
FIG. 2B is a front elevation view of the engine shown in FIG. 2A.

FIG. 1A shows the engine of the present invention. The engine 1 comprises an outer casing including a rotor case 8, a flywheel housing 36 and a valve cover 5. Each of these protects internal working parts by preventing foreign debris or materials from coming into contact with the internal workings of the engine. The various casings, housings and covers may be attached by known means such as bolts, screws, clips, fasteners or other such securing means.

In this embodiment, the engine 1 is shown as a gasoline type of engine. However, it may be noted that the engine may be modified to be driven with air, diesel, battery or steam. One of ordinary skill in the art can readily recognize that modifications may be undertaken to allow the engine to be driven by various propellants or forms of energy.

The upper portion of the engine comprises an air chamber 4 defined by head 63. Air flows into air chamber 4 through air intake vent 14 for use in the combustion process. Typically head 63 is constructed of a light-weight metal such as cast steel or aluminum and may include an inner liner of composite material for preventing expansion of the head when pressure within the air chamber 4 is increased. Head bolts 49 secure the head 63 to the engine 1 and allow access to the inner air chamber for maintenance or other such reasons.

A combustion chamber 13 is provided opposite the air chamber 4 for combustion of fuels. Fuel is injected into the combustion chamber 13 along with pressurized air provided from the air chamber 14 before combustion. A spark plug 3 electronically controls the firing or combustion of the pressurized fuel within the combustion chamber 13. The unique design of the engine 1 separates the operation of pressurizing air and fuel into different chambers. In other engines, this step is achieved by pressurizing a fuel/air mixture within a piston chamber by compressing the fuel/air mixture with the piston. A head 64 defines the combustion chamber 13 and includes bolts 49 for allowing access to the combustion chamber for maintenance purposes.

A lower portion of the engine 1 includes an oil reservoir 18 for storing a lubricant that is used to reduce internal friction and wear of the moving parts. Bolts 53 secure the engine case to prevent access to the internal workings of the engine. These bolts 53 may be removed to allow maintenance of the internal workings as necessary. Mounting bolts 50 are provided for securing the engine 1 in a desired location. An exhaust port 16 expels combusted gases from the interior of the engine.

In FIG. 1B, the engine is shown from the side. A dipstick 9 is provided for measuring the level of lubricant necessary for operating the engine. The dipstick 9 may include marks that indicate the level of lubricant within the oil reservoir 18.

A throttle control 11 controls the amount of air that is drawn into air chamber 4 for proper mixture of the fuel-to-air ratio. By controlling oxygen that is fed into the air chamber 4, the fuel-to-air ratio may be manipulated to control the revolutions of the piston. That is to say, the amount of pressure exerted onto the rotor may be controlled by manipulating the airflow into the air chamber 4.

A fuel injector 12 controls the amount of fuel flowing into the combustion chamber 13. The fuel injector 12 is controlled by a microprocessor, not shown. A fuel pump, not shown, pressurizes the fuel such the injector 12 may open and close in a rapid succession to create an aerosol spray of fuel that is supplied to the combustion chamber 13.

Now turning to FIGS. 2A through 2E, that show the various views of the engine 1 with the outer protective casings removed. A compression pump 10 communicates with the air intake vent 14 to draw in air, compress it and force air into air chamber 4. The compression pump 10 is discussed in greater detail in FIG. 7. In one embodiment, the compression pump 10 is coupled to the crankshaft 2 and driven by the engine 1. However, it can be easily recognized that other compression pumps or compressors may be electrically driven to supply pressurized air to the air chamber. A pressure feed tube 54 is provided for transporting pressurized air from the compression pump 10 to the air chamber 4.

Figure 3A:
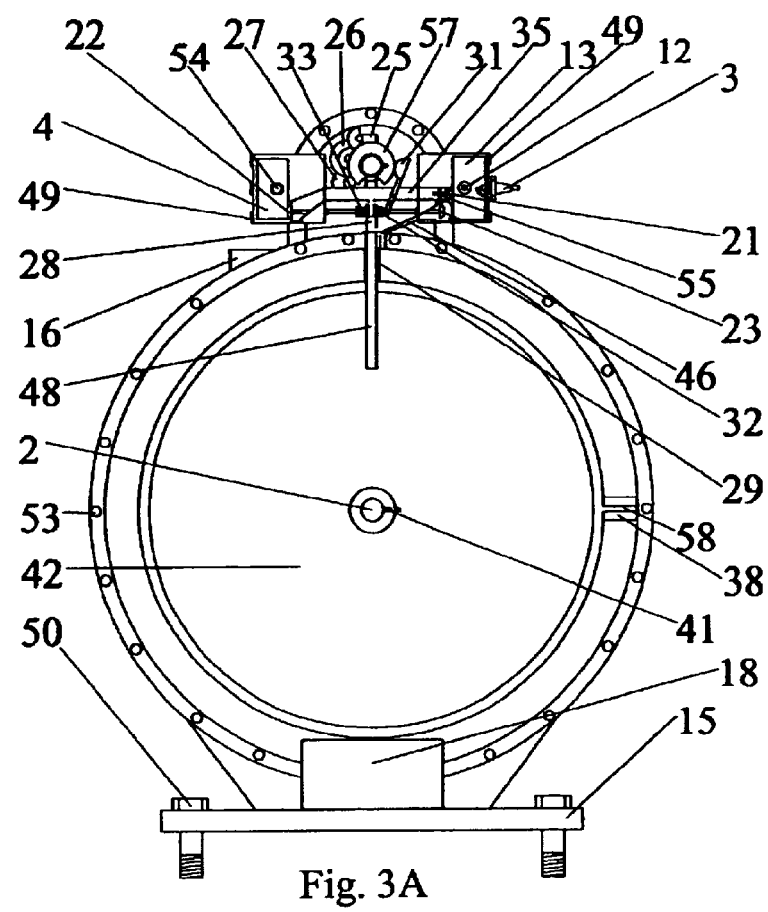
FIG. 3A is a front elevation view of the engine shown with a timing system and a front rotor plate removed.
Figure 3B:
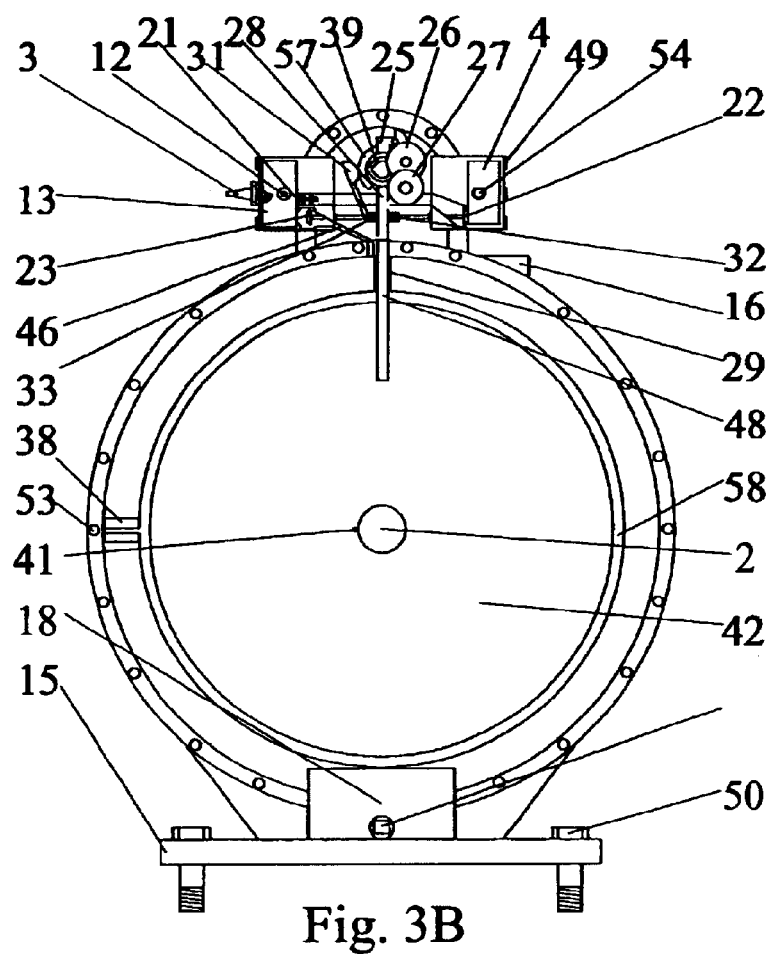
FIG. 3B is a back elevation view of the engine shown in FIG. 3A with an air compressor and back plate removed.
Figure 3C:
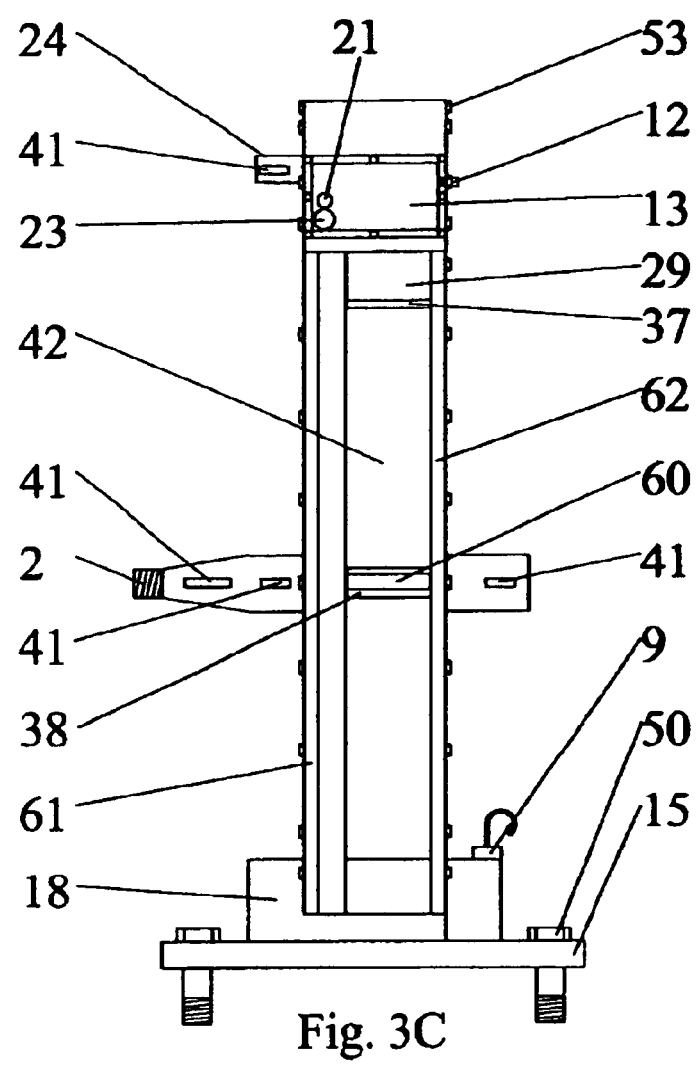
FIG. 3C is a right side elevation view of the engine shown in FIG. 3A with an outer center rotor case and the head for the combustion chamber removed.
Figure 3D:
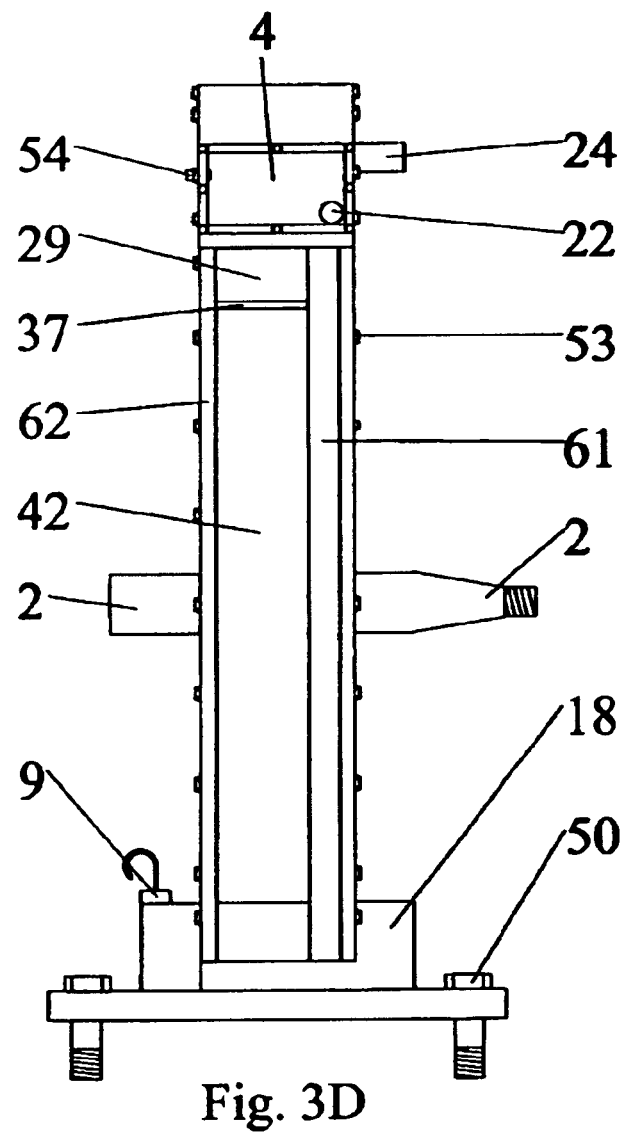
FIG. 3D is a left side elevation view of FIG. 3C.

A back rotor plate 62 and front rotor plate 61 provide support for the piston rotor 42, shown in FIG. 3A. The rotor plates 61, 62 provide a sealed lubricating chamber in which piston rotor 42 travels around.

A timing belt 40 is driven by the crankshaft 2 to control the timing of the firing and pressurized air inflow sequences. The timing belt 40 overlaps both timing gears 20B and 20A. Timing gear 20B is coupled to the crankshaft 2 for driving the timing belt 40 and causing it to drive timing gear 20A. Timing gear 20A is coupled to camshaft 24 for controlling the operation of camshaft 24. Camshaft 24 is retained by bolts 52.

An ignition coil 7 is coupled to spark plug 3 for providing an electric pulse thereto. The ignition coil 7 generates an electric pulse as the flywheel 65 passes near the coil 7 in a known fashion. The ignition coil 7 is secured by bolts 51.

Flywheel 65 stores and provides rotational energy for driving the engine. The flywheel 65 comprises magnets that provide a magnetic pulse to the ignition coil 7 as the flywheel 65 passes near the coil 7. This magnetic pulse is relayed from the ignition coil 7 to the spark plug 3 for combustion purposes. A crankshaft nut 6 secures the flywheel 65 and the crankshaft 2.

Figure 2C:
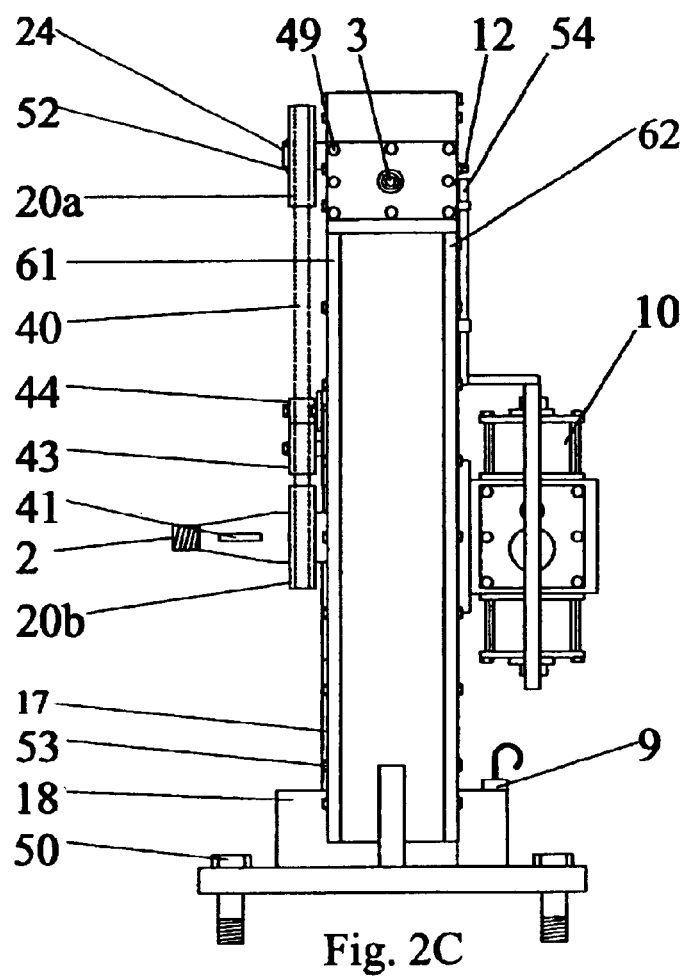
FIG. 2C is a right side elevation view of the engine shown with a flywheel and ignition coil removed.
Figure 2D:
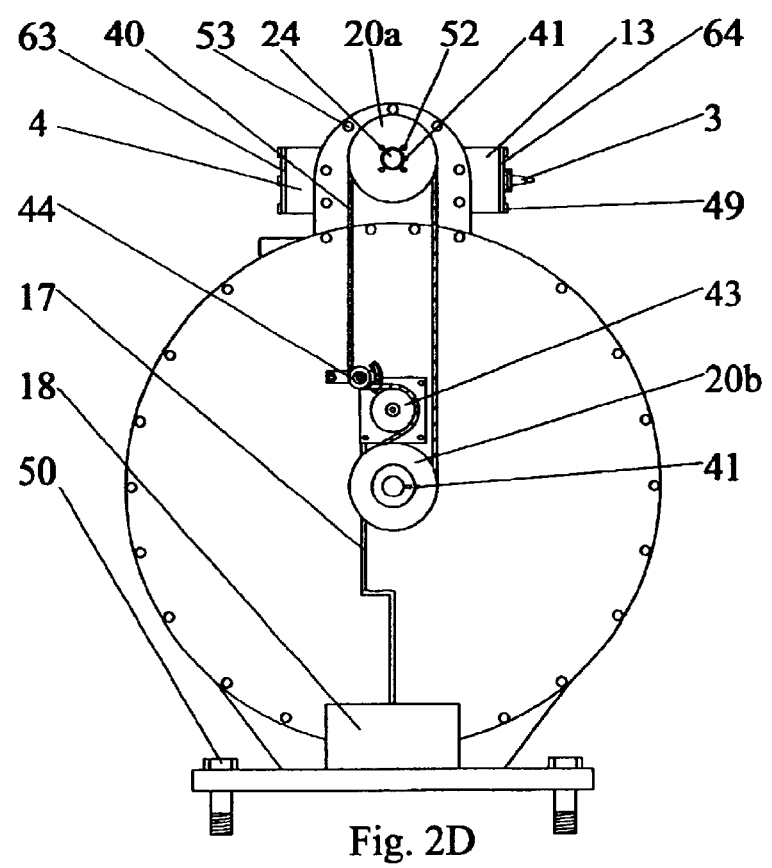
FIG. 2D is a front elevation view of the engine shown in FIG. 2C.
Figure 2E:
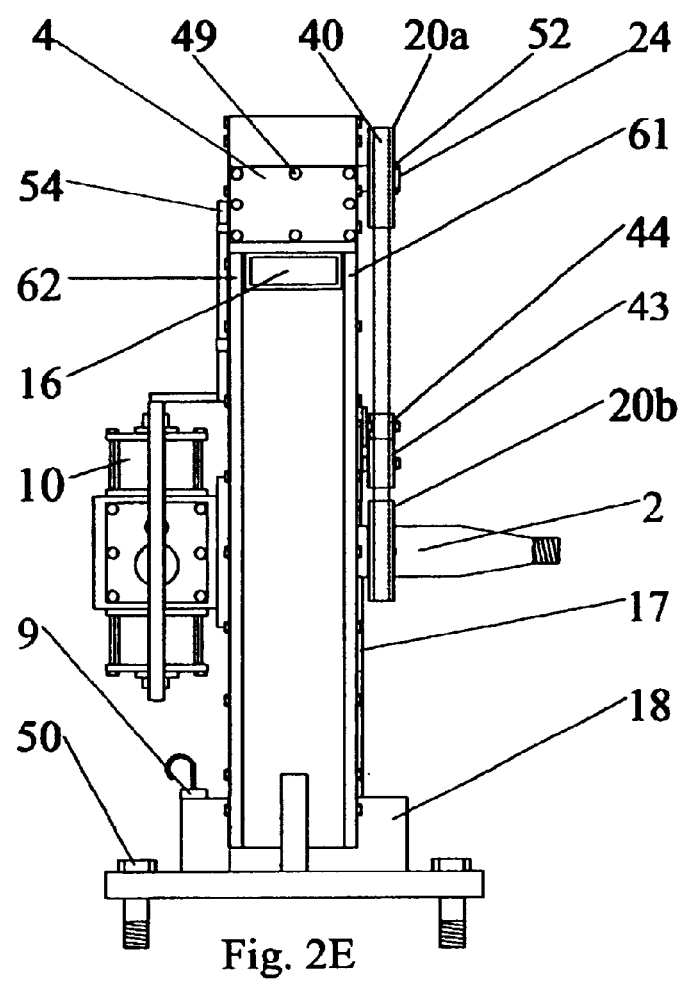
FIG. 2E is a left side elevation view of the engine shown in FIG. 2C.

Now turning to FIG. 2C, an idle pulley adjustment device 44 is provided for adjusting tension on the timing belt 40. This device 44 exerts constant pressure onto the timing belt 40 to prevent it from slipping from gears 20A and 20B.

An oil pump 43 is also driven by timing belt 40 to cause pressurized lubricant to be forced through a series of lubricating orifices, not shown. The oil pump 43 draws oil from the oil reservoir 18 and routes it to specific areas within the engine 1. A moon key 41 is inserted into an opening in the crankshaft 2 for ensuring that the flywheel 65 is maintained in a proper relationship to crankshaft 2.

FIG. 3A shows a front elevation view of the internal workings of the engine 1. In this view, the timing system and a front rotor plate is removed. Motor mount 15 comprises the motor mount casing to provide a stable support that holds the engine in a fixed position during operation. Piston 38 attaches to rotor 42 to drive the rotor 42 in a circular manner. Rotor seal 58 is disposed between the piston 38 and rotor 42 to ensure proper sealing of the rotor 42 with the outer casing to prevent leakage of gases that drive the piston 38. The rotor seal may comprise a composite, metal, rubber, fiberglass or other such known material. Both the piston 38 and the rotor 42 comprise a track or guide, not shown, for accepting the rotor seal 58.

Valve door 29 moves towards and away from the crankshaft 2 to direct the flow of gases or other propellants towards the backside of the piston 38. Thus, the valve door 29 provides a base against which the explosion of fuel reacts to propel the piston 38 in a forward direction. The valve door 29 also acts to prevent propellants from flowing in a wrong direction. The valve door 29 includes a valve rail 48 ensuring proper alignment of the valve door 29 as it is lifted away from the crankshaft 2 during a completed rotation of the rotor 42 and allowing the piston 38 to pass.

An exhaust check valve spring 32 maintains proper tension on the exhaust check valve 23 to prevent leakage of propellants from the combustion chamber 13. The exhaust check valve 23 seals the combustion chamber and is forced open when combustion of the propellants occurs to allow the expanding gases to be directed into the rotor case to drive the piston 38. An exhaust input 46 directs these expanding gases between the piston 38 and the valve door 29.

Check valve spring 55 biases check valve 21 to allow pressured air to flow from air chamber 4 into combustion chamber 13 while preventing a back flow of gases and propellants from the combustion chamber 13 into air chamber 4. Pressurized air conduit 35 directs air from the air chamber 4 into the combustion chamber 13.

Valve rocker arm 31 attaches at one end to exhaust check valve 23 and at a second end to cam lobe 5 to control the opening and closing of the exhaust valve 23 to direct propellants against the piston 38. Cam lobe 57 comprises the camshaft 24. The cam lobe 57 controls the opening and closing of the exhaust check valve 23 in a known manner.

Lifter 25 controls opening and closing of the valve door 29. The lifter 25 comprises a gear that is rotated in opposite directions to raise and lower the valve door 29 such that it moves towards and away from the crankshaft 2 to optimize the amount of energy that is directed against the piston 38. Through series of multiplier gears 26 and 27, the amount of movement necessary to lift the valve door 29 is minimal. That is to say, a maximum of 20 degrees of rotation of the cam 24 causes the valve door 29 to be lifted and lowered to complete one revolution of the piston 38.

Figure 4A:
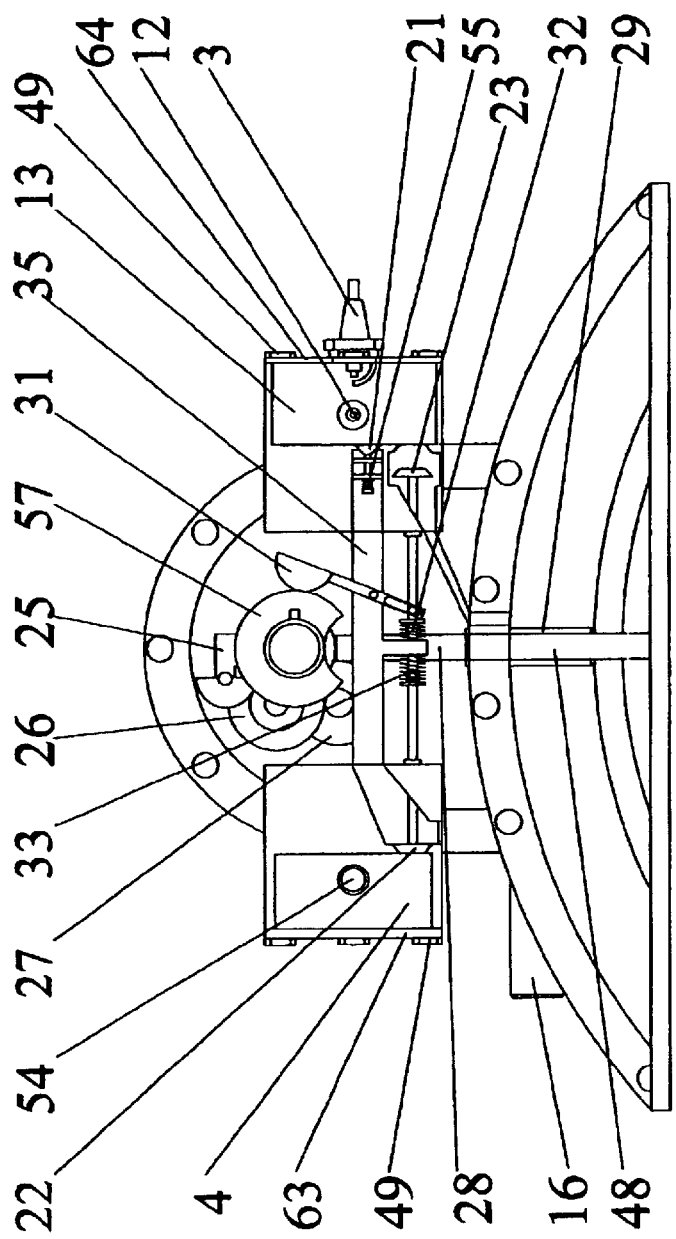
FIG. 4A is an enlarged front elevation view of the valve system.
Figure 4B:
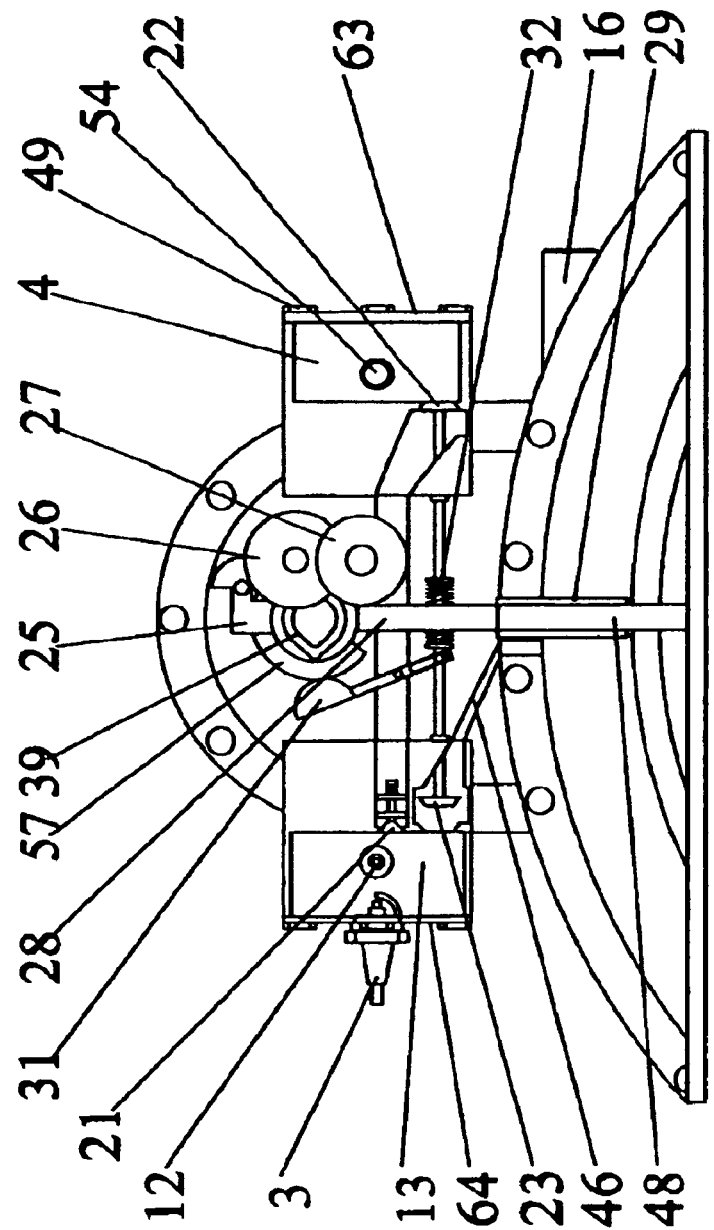
FIG. 4B is an enlarged back elevation view of the valve system.
Figure 4C:
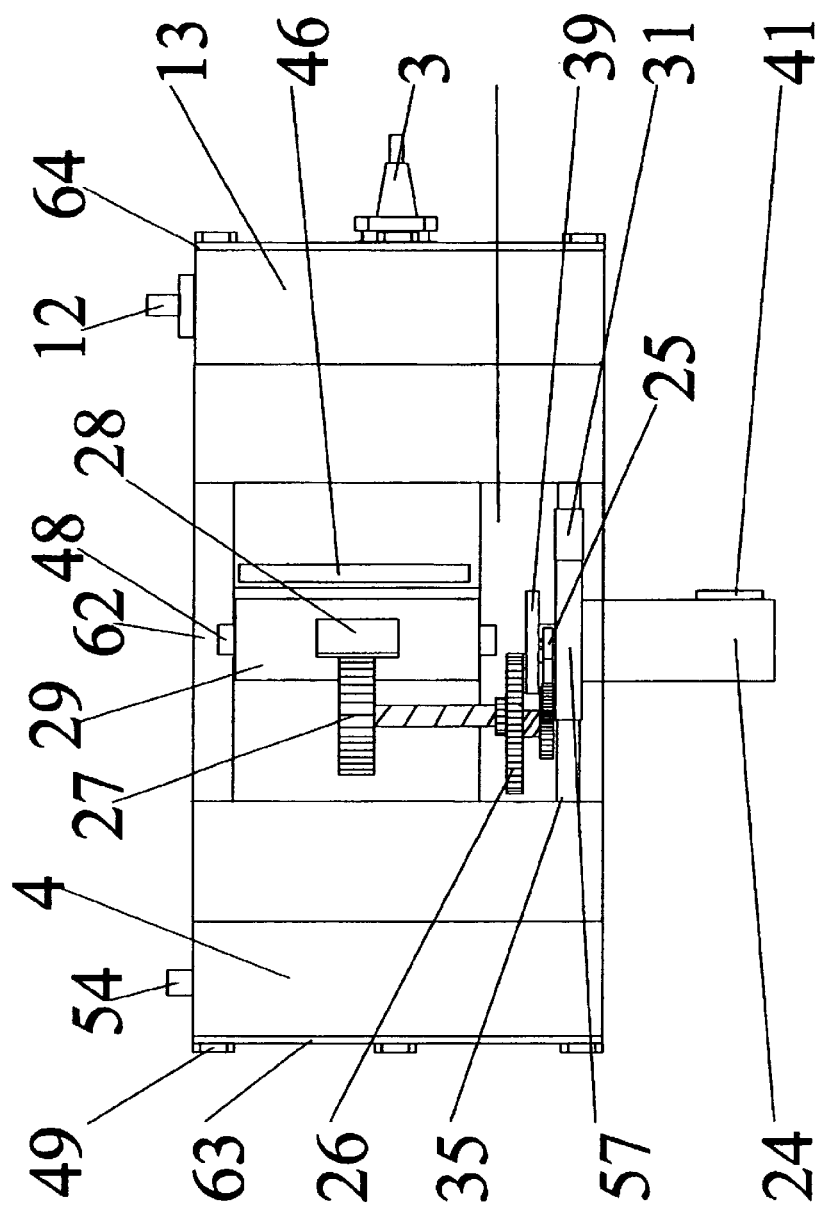
FIG. 4C is a top plan view of the valve system shown in FIGS. 4A and 4B.

Air chamber check valve spring 33 prevents leakage of pressurized air from air chamber 4. When the internal pressure of air chamber 4 exceeds a predetermined threshold, check valve 22 opens to allow pressurized air to flow from the air chamber 4 through conduit 35 into combustion chamber 13. It should be noted that check valve 22 and check valve 23 are arranged such that only one can open at a given time. That is to say, both check valves 22 and 23 cannot be open at the same moment in time. FIG. 4B is an enlarged back elevation view of the valve system that more clearly depicts cam track 39. FIG. 4C is an overhead plan view of the arrangement of parts in the valve system of FIGS. 4A and 4B. Bearings, not shown are provided for securing camshaft 34 in place.

Figure 4D:
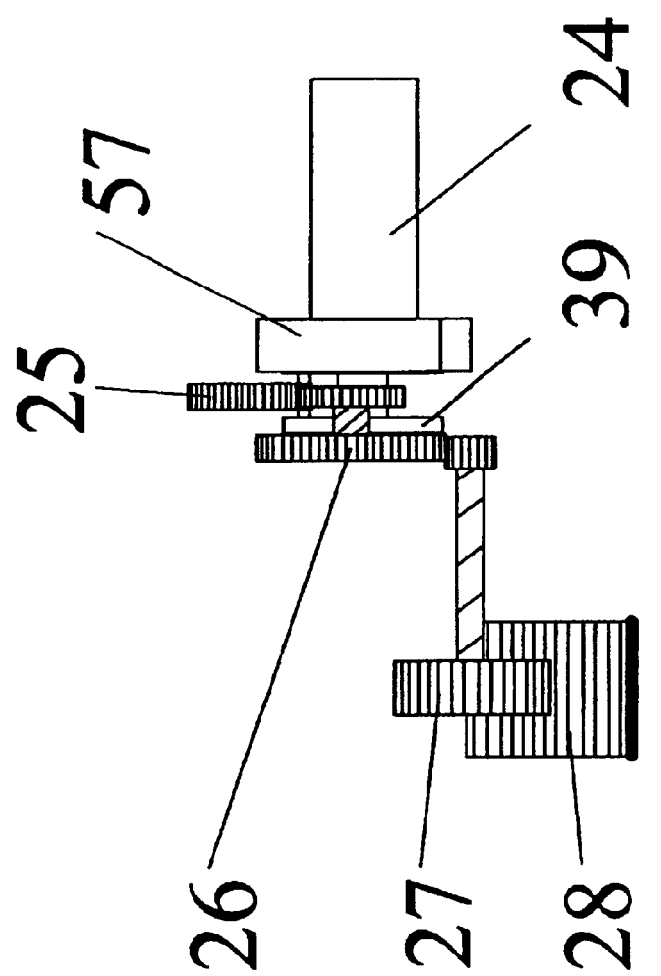
FIG. 4D is a left side elevation view of the cam gear system.
Figure 4E:
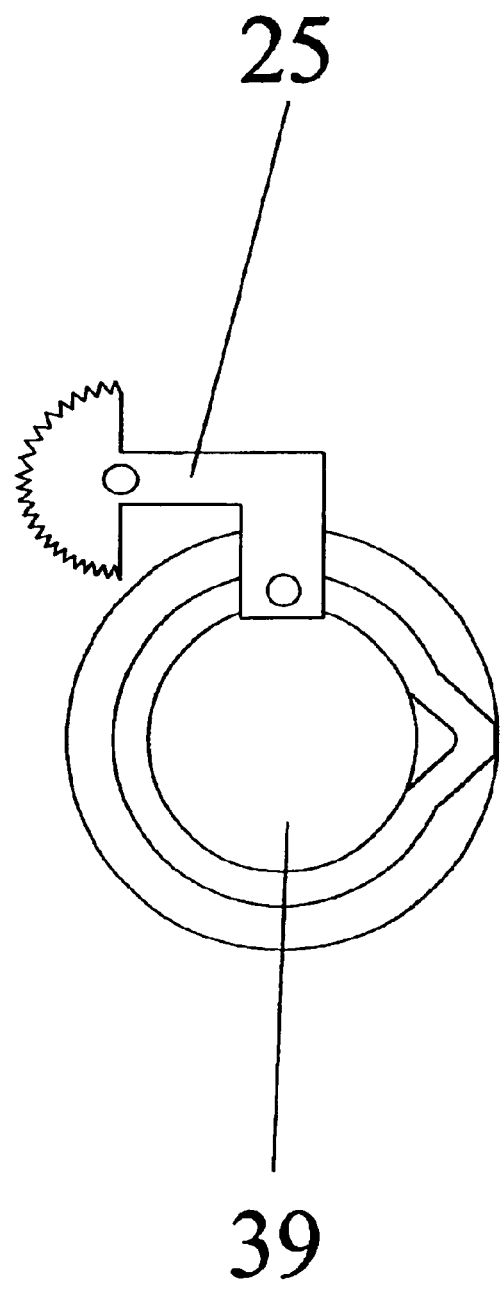
FIG. 4E is a front elevation view of the lifter and cam track shown in FIG. 4D.

FIGS. 4D and 4E show the cam gear system and arrangement of gears for actuating the various parts. In FIG. 4D rotation from cam shaft 24 is translated to cam track 39 and cam lobe connector 57. Cam track 39 drives lifter 25 which connects to gear 26 via a common shaft. Lifter 25 drives gear 26. Gear 26 is coupled to gear 27 via a second shaft to drive it. Therefore, gears 26 and 27 increase or multiple rotational movement of gear 25. This rotational movement is translated into linear movement by gear track 28 for raising and lowering the valve door 29, as previously discussed. FIG. 4E shows the arrangement of lifter 25 and cam track 39.

FIG. 5A is an exploded view of the rotor 42 and rotor case assembly. Front rotor plate 61 includes a valve track 30. Back rotor plate 62 also includes a valve track 30. These valve tracks operate as previously discussed to allow movement of the valve door 29 towards and away from the crankshaft 2. Front and back rotor plates 61 and 62 connect to outer rotor case 56. A pair of rotor seal vanes 58 is disposed against the rotor 2 to prevent gases from leaking between the rotor 2, piston 38 and the housing, as previously discussed. Springs 59 are arranged at various locations on the rotor 2 to bias the vanes 58 towards the plates 61 and 62 to ensure a proper seal.

A seal vane 37 is provided for sealing between the valve door 29 and the rotor 42 to prevent leakage of gases therebetween. The arrangement of the seal vane 37 and valve door assembly is more clearly shown in FIG. 5C. FIG. 5B is a partial exploded view of the rotor and rotor case components with the rotor seal vane 58 in place.

FIG. 5C is an exploded view of the valve door assembly. The valve door 29 includes gear track 28 that couples to gear 27 as shown in the previous figures. A pair of valve rails 48 attach to sides of the valve door 29 by screws 47. Seal vane 37 attaches to an inner or bottom portion of the valve door 29 via screws 45. It should be noted that the valve door 29 includes a recess for accommodating the vane 37. Springs 59 are disposed between the vane 37 and the recess of the valve door 29 as shown. These springs 59 force the vane 37 away from the valve door 29 to ensure a proper seal when the valve door 29 and rotor 42 meet.

Figure 5D:
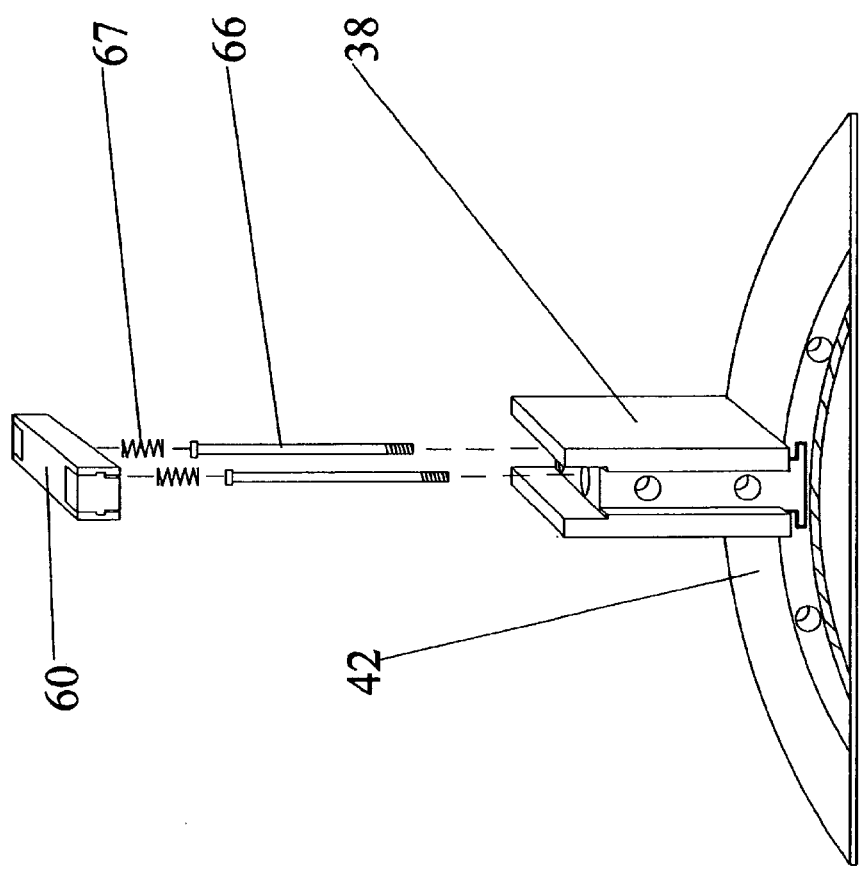
FIG. 5D is an exploded view of the piston assembly.

FIG. 5D shows the piston assembly. The vane seal 60 for the piston 38 is seated between the piston 38 and the outer rotor case 56, shown in FIG. 5A. A pair of springs 67 are disposed against a pair of screws 66 that secure the piston 38 to the rotor 42. The vane seal 60 prevents leakage of gases between the piston 38 and the outer rotor case 56. Ends of the vane seal 60 contact the rotor vane seals 58 to seal the piston 38. Piston 38 includes a lower extension that locks the piston 38 into the rotor 42, as shown. The vane seal 60 includes recesses on either end as shown for accepting end caps 69 as shown in FIG. 5F. As more clearly seen in FIG. 5F, the rotor vane seals 58 include keys 68 for accepting seal 60. Springs 70 are disposed between end caps 69 and seal 60. The end caps 69 are seated in recesses within the seal 60.

Figure 5E:
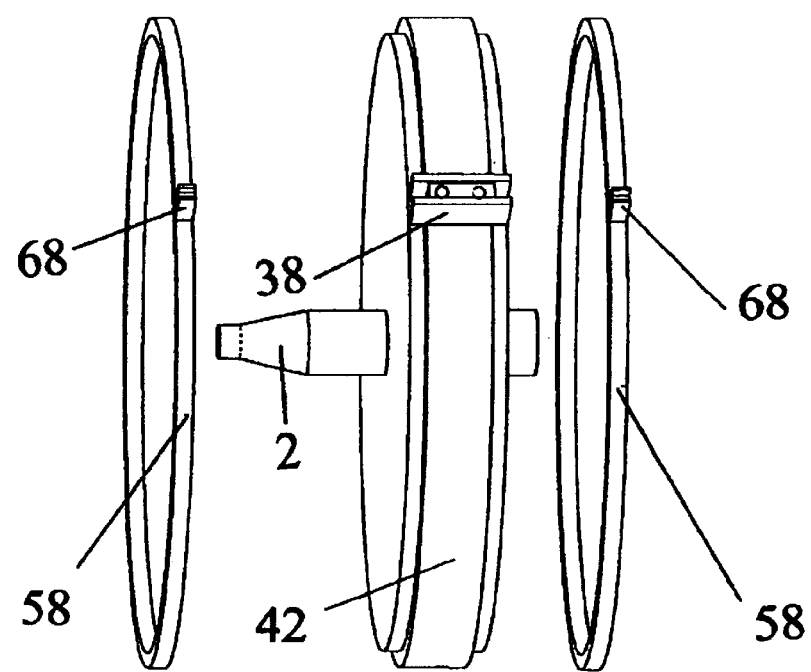
FIG. 5E is an exploded view of the rotor and the rotor seal vanes.
Figure 5G:
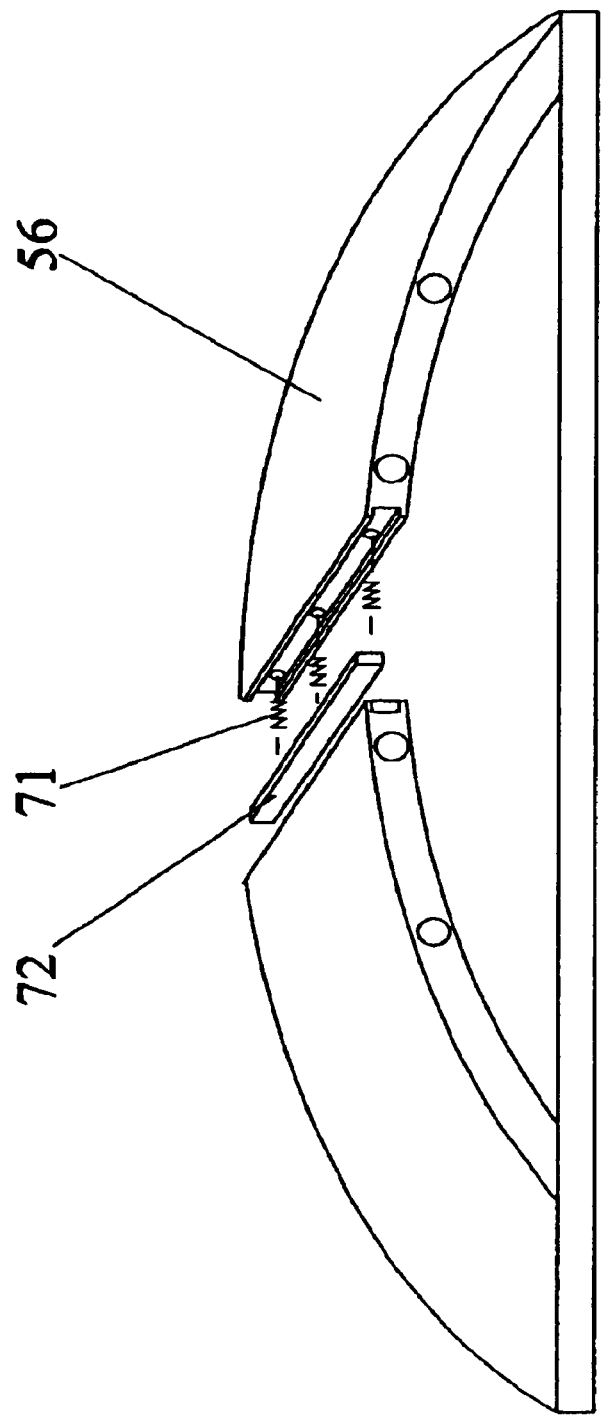
FIG. 5G is an enlarged view of a seal for sealing the outer rotor case near where the valve door operates.

FIG. 5G shows the outer rotor case seal 72 that seats within a recess provided in the outer rotor case 56. A plurality of springs 71 are disposed between the recess and the seal 72. Not shown are the input and output openings for depositing combusting fuel into the rotor casing 56 and exhausting spent fuel therefrom.

FIG. 5E is an exploded view of the piston showing the rotor seal vanes 58 in relation to the piston 38. Each rotor seal vane 58 includes a key 68 that mates with a lip on the piston 38 to ensure that each vane 58 moves in concert with the piston 38. Causing the vanes 58 to move with the piston 38 prevents a buildup of internal friction between the rotor 38 and the vane 58.

Figure 6A:
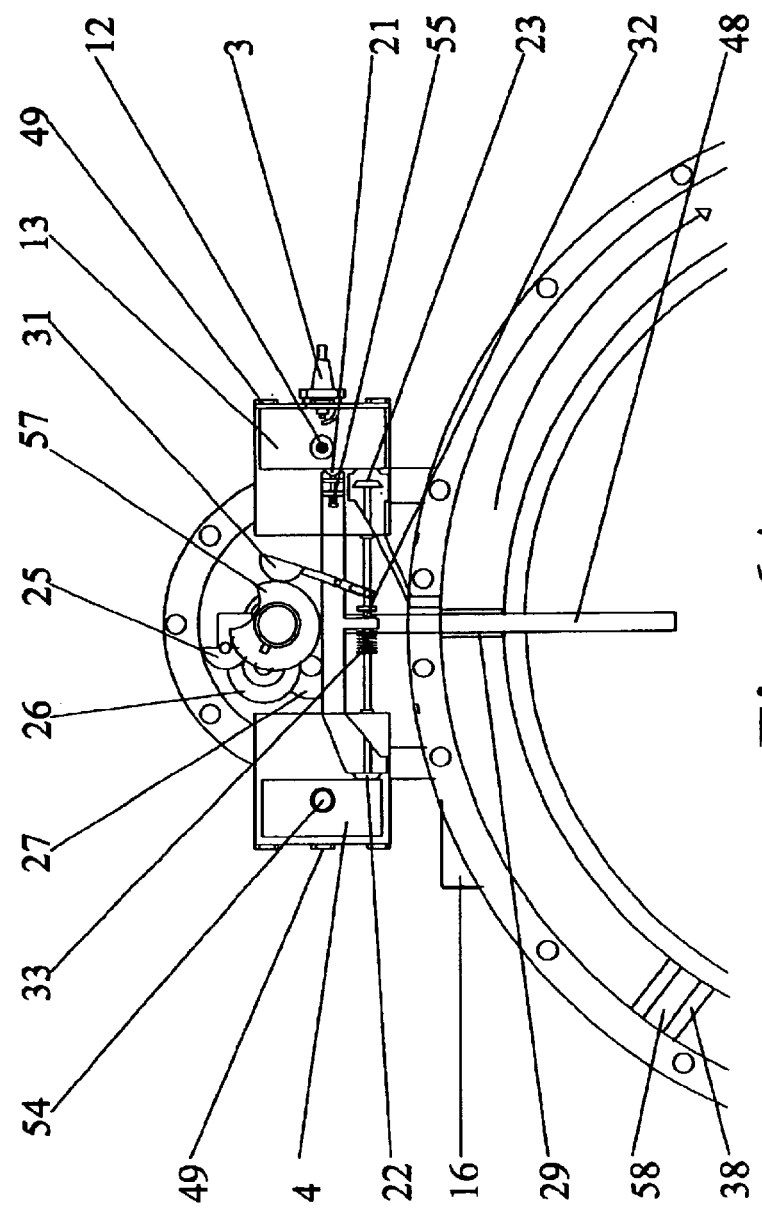

FIGS. 6A through 6D show a timing cycle of operation for the piston and valve assembly. In FIG. 6A, the piston 38 is shown at approximately 300 degrees into the operation cycle. The exhaust valve 23 is held open by the rocker arm 31 that is being operated by the cam lobe 57. During the operating cycle, the air chamber 4 is being pressurized by the air pump 10 through pressure feed tube 54. The valve 23 prevents port valve 22 from opening to allow the pressurized air to flow into the combustion chamber 13. Air in front of the piston 38 is forced from the exhaust port 16 to prevent a build up of pressure in front of the piston 38.

In FIG. 6B, the piston 38 is shown at approximately 350 degrees. In this view, exhaust check valve 23 is forced shut by the biasing force of exhaust check valve spring 32 as controlled by the valve rocker arm 31 which is driven by cam lobe connector 57. Pressure from the air chamber 4 forces the port valve 22 open allowing pressurized air to flow from the air chamber 4 into combustion chamber 13. Check valve 21 is also forced open until pressure within each chamber becomes equalized. When pressure is normalized between the chambers, a biasing force from the springs 33 and 55 closes each valve 21 and 22.

Figure 6C:
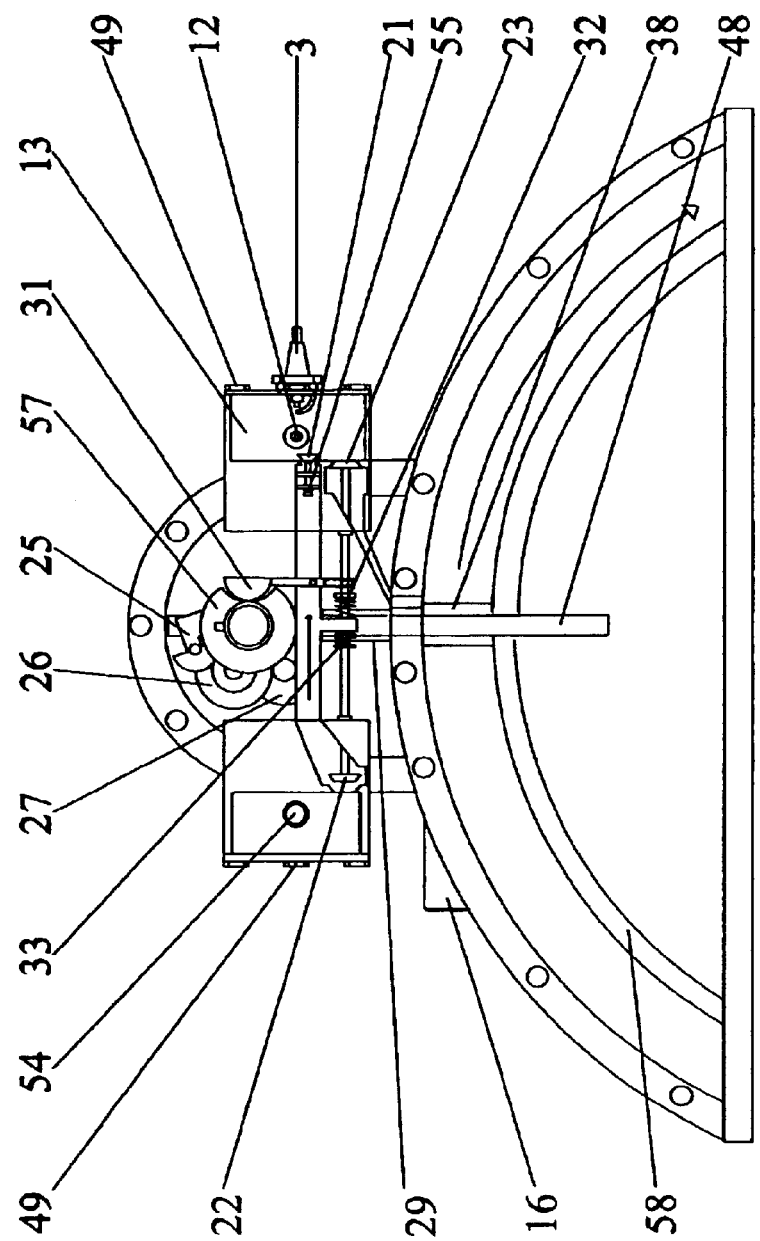

In FIG. 6C, the piston 38 has completed one revolution and returns to zero degrees. The lifter 25 is already activated to open the valve door 29 preventing the rotor piston 38 from contacting it and becoming damaged. In other words, the valve door 29 moves away from the rotor 42 to allow the piston 38 to complete a cycle. At this time, all pressure created by combustion of the fuel has been expended and released.

Figure 6D:
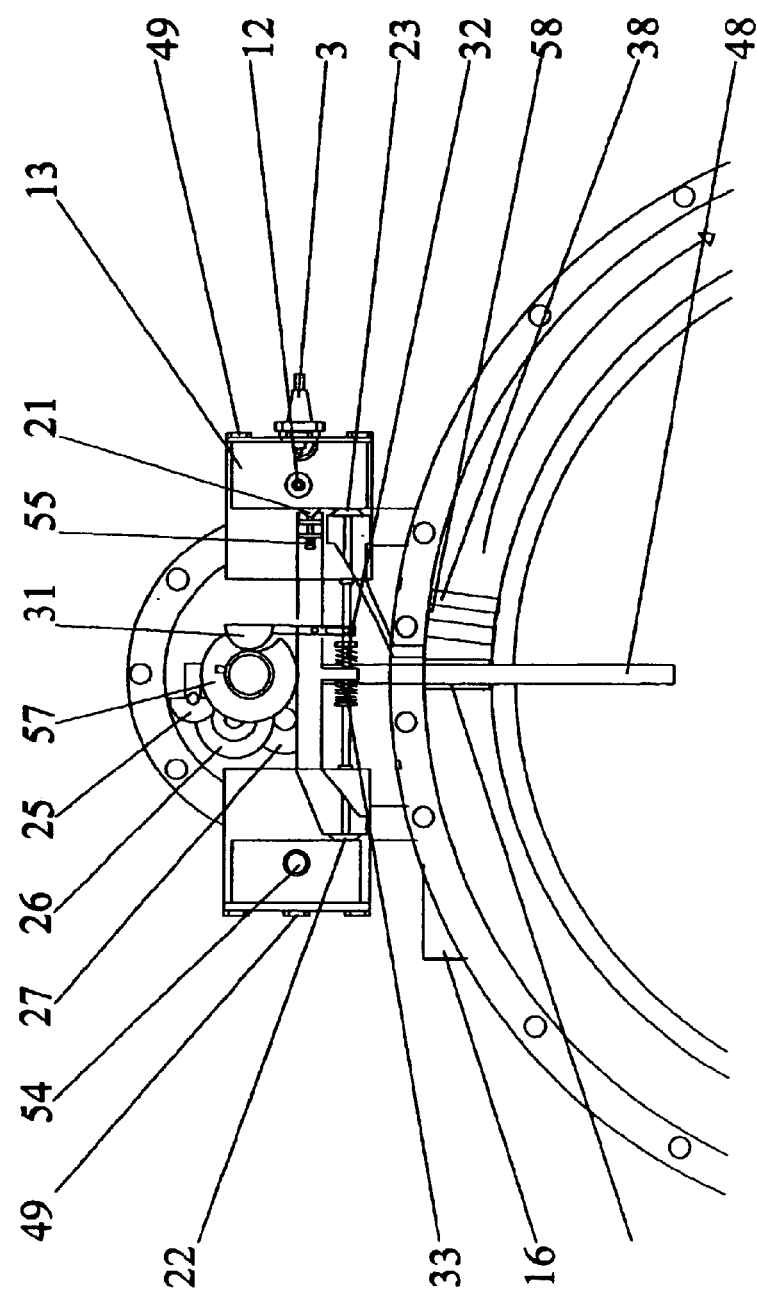

In FIG. 6D, the piston 38 is at approximately ten degrees. Valve door 29 has returned to its normal position and is shut. Fuel injector 12 injects fuel into the combustion chamber 13. Check valve 23 is biased shut by spring 32 until fuel within the combustion chamber 13 is ignited. Upon ignition of the fuel, the valve 23 is forced open to allow expanding gases to flow from the combustion chamber 13 into the space between the valve door 29 and the piston 38. The force from the expanding gases is exerted against the backside of the piston 38 causing it and the rotor 42, as well as the crankshaft 2, to rotate. During this process, spent fuel from the previous burning cycle is forced from the exhaust port 16.

Figure 7:
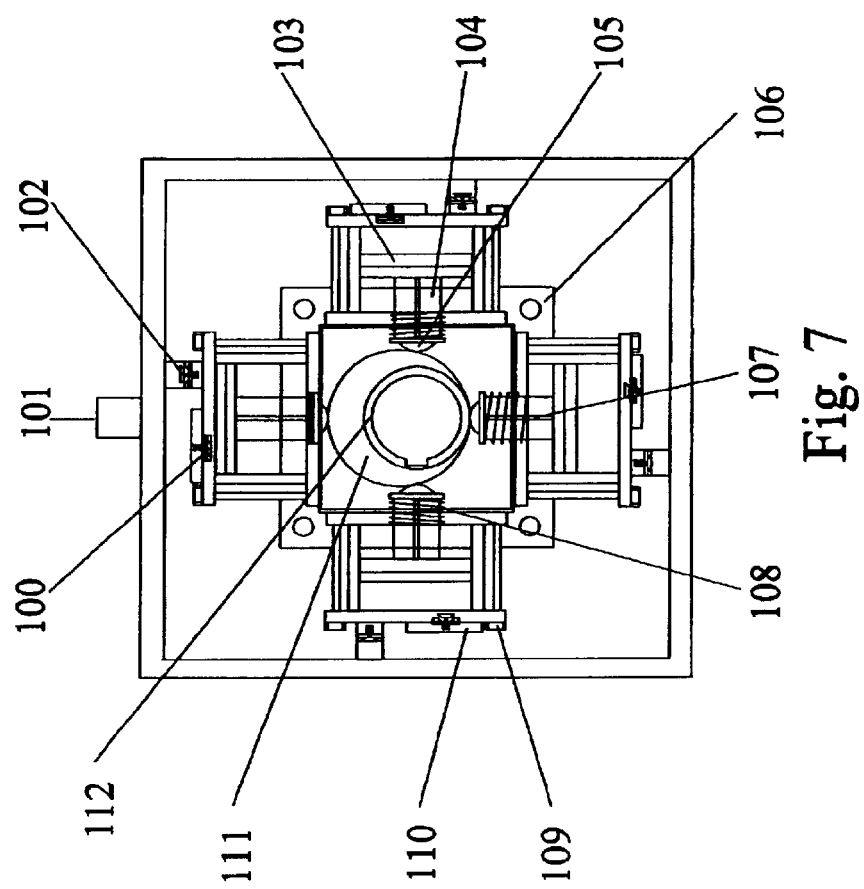
FIG. 7 an elevation view of the compression pump.

FIG. 7 is a plan view of the air compressor shown without a housing. An intake check valve 100 allows air to flow into the compressor while preventing it from flowing outward through the intake. An output port 101 directs compressed air from the compressor into the pressure feed tube 54 and connects thereto. An output check valve 102 allows air to be forced outward through output port 101 whilst preventing it from flowing from the air chamber 4 back into the compressor.

Piston 103 moves towards and away from the inner cam 112 that is sleeved onto the crankshaft 2. Piston rod 104 connects to piston 103 for forcing the piston 103 towards or away from the outer cam lobe 111. Roller pin 105 connects to the piston rod 104 to run along the outer perimeter of the outer cam lobe 111 to compress air. The compressor mounts to the engine via mounts 106 as shown in FIG. 2A.

Piston rod track 107 includes a groove that prevents the roller pin. 105 from turning in an undesirable direction. The piston rod spring 108 maintains pressure between the piston 103 and the outer cam lobe 111. It also forces the piston 103 towards the inner cam 112. Head bolts 109 maintains the upper heads of the piston 103 in place and allows access for maintenance. Intake screen 110 prevents debris and foreign objects from entering intake check valve 100.

It is to be understood that the invention is not limited to the exact construction illustrated and described above, but that various changes and modifications may be made without departing from the spirit and the scope of the invention as defined in the following claims.

I claim:

1. A rotary engine having a housing including walls that define a cylinder, said rotary engine comprising:
   an air chamber for receiving and storing pressured air for use in a combustion process;
   a combustion chamber connected to said air chamber to receive pressurized air therefrom, said combustion chamber including a first opening for receiving fuel and a second opening for accepting an end of a spark plug to ignite fuel within the combustion chamber and an output to direct expanding gases into the cylinder;
   a piston operating within said cylinder and driven by expanding gases directed from the combustion chamber, said piston including a seal for preventing expanding gases from passing between the piston and the walls of the housing that define the cylinder;
   a valve door that provides a base against which expanding gases react to propel the piston in a forward direction, said valve door including a valve rail ensuring proper alignment of the valve door as it is lifted to allow the piston to pass to complete a rotation;
   a rotor coupled to said piston; and
   a crankshaft coupled to said rotor.

2. The rotary engine of claim 1 wherein said valve door includes a gear track that couples to a gear for inserting and extracting the valve door into and from the cylinder, said valve door further including a pair of valve rails attached to sides of the valve door and a seal vane attached to an portion of the valve door.

3. The rotary engine of claim 2 wherein said valve door further comprises a recess for accommodating a vane and springs disposed between the vane and a recess of the valve door to force the vane away from the valve door ensuring a proper seal when the valve door is seated against the rotor.

4. The rotary engine of claim 1 further including a compression pump coupled to the air chamber for providing pressurized air thereto.

5. The rotary engine of claim 4 further wherein said compression pump comprises:
   an intake check valve that allows air to flow into the compressor pump while preventing it from flowing outward through an intake;
   an output port that directs compressed air from the compressor into a pressure feed tube coupled to the air chamber;
   an output check valve that allows air to be forced outward through the output port whilst preventing it from flowing from the air chamber back into the compressor pump;
   an air compressor piston that moves towards and away from an inner cam that is sleeved onto the crankshaft;
   a piston rod connecting to the air compressor piston for forcing the air compressor piston towards and away from an outer cam lobe and,
   a roller pin that connects to an air compressor piston rod to run along an outer perimeter of the outer cam lobe to compress air.

6. The rotary engine of claim 1 further comprising a timing belt connected to and driven by the crankshaft to control timing of firing and pressurized air inflow sequences.

7. The rotary engine of claim 6 wherein the timing belt overlaps a first and second timing gear, said first timing gear is coupled to the crankshaft for driving the timing belt and causing it to drive the second timing gear, the second timing gear is coupled to a camshaft for controlling the operation of a camshaft to cause the valve door to be lifted and lowered from and towards the rotor.

8. The rotary engine of claim 1 further comprising:
   an exhaust check valve that seals the combustion chamber and is forced open when combustion of the propellants occurs to allow expanding gases to be directed into the cylinder to drive the piston;

an exhaust check valve spring connected to the exhaust check valve to maintain proper tension on the exhaust check valve to prevent leakage of propellants from the combustion chamber;

an exhaust input that directs expanding gases between the piston and the valve door;

a pressurized air conduit that directs air from the air chamber into the combustion chamber; and, a check valve spring coupled to a check valve located between the air chamber and the combustion chamber to allow pressured air to flow from air chamber into combustion chamber while preventing a back flow of gases and propellants from the combustion chamber into air chamber.

9. The rotary engine of claim 1 further comprising a valve rocker arm that attaches at one end to an exhaust check valve and at a second end to cam lobe to control an opening and closing of the exhaust valve to direct propellants against the piston.

10. The rotary engine of claim 1 further comprising a lifter that controls opening and closing of the valve door, said lifter comprises a gear that is rotated in opposite directions to raise and lower the valve door such that it moves towards and away from the crankshaft to optimize the amount of energy that is directed against the piston.

11. The rotary engine of claim 1 further comprising a vane seal for the piston that is seated between the piston and the wall of the housing that defines the chamber, said vane seal preventing leakage of gases between the piston and the walls of the housing that define the cylinder.

12. A rotary engine having a housing that defines a cylinder, said rotary engine comprising:

an air chamber for receiving and storing pressured air for use in a combustion process;

a combustion chamber connected to said air chamber to receive pressurized air therefrom, said combustion chamber including a first opening for receiving fuel and a second opening for accepting an end of a spark plug to ignite fuel within the combustion chamber and an output to direct expanding gases into the cylinder;

a piston operating within said cylinder and driven by expanding gases directed from the combustion chamber, said piston including a seal for preventing expanding gases from passing between the piston and the walls of the housing that define the cylinder;

a valve door that provides a base against which expanding gases react to propel the piston in a forward direction, said valve door including a valve rail ensuring proper alignment of the valve door as it is lifted to allow the piston to pass to complete a rotation, said valve door includes a gear track that couples to a gear for inserting and extracting the valve door into and from the cylinder, said valve door further including a pair of valve rails attached to sides of the valve door and a seal vane attached to an portion of the valve door, said valve door also including a recess for accommodating a vane and springs disposed between the vane and a recess of the valve door to force the vane away from the valve door ensuring a proper seal when the valve door is seated;

a rotor coupled to said piston; and a crankshaft coupled to said rotor.

13. The rotary engine of claim 12 further including a compression pump coupled to the air chamber for providing pressurized air thereto.

14. The rotary engine of claim 13 further wherein said compression pump comprises:

an intake check valve that allows air to flow into the compressor pump while preventing it from flowing outward through an intake;

an output port that directs compressed air from the compressor into a pressure feed tube coupled to the air chamber;

an output check valve that allows air to be forced outward through the output port whilst preventing it from flowing from the air chamber back into the compressor pump;

an air compressor piston that moves towards and away from an inner cam that is sleeved onto the crankshaft;

a piston rod connecting to the air compressor piston for forcing the air compressor piston towards and away from an outer cam lobe and, a roller pin that connects to an air compressor piston rod to run along an outer perimeter of the outer cam lobe to compress air.

15. The rotary engine of claim 12 further comprising a timing belt connected to and driven by the crankshaft to control timing of firing and pressurized air inflow sequences.

16. The rotary engine of claim 15 wherein the timing belt overlaps a first and second timing gear, said first timing gear is coupled to the crankshaft for driving the timing belt and causing it to drive the second timing gear, the second timing gear is coupled to a camshaft for controlling the operation of a camshaft to cause the valve door to be lifted and lowered from and towards the rotor.

17. The rotary engine of claim 12 further comprising:

an exhaust check valve that seals the combustion chamber and is forced open when combustion of the propellants occurs to allow expanding gases to be directed into the cylinder to drive the piston;

an exhaust check valve spring connected to the exhaust check valve to maintain proper tension on the exhaust check valve to prevent leakage of propellants from the combustion chamber;

an exhaust input that directs expanding gases between the piston and the valve door;

a pressurized air conduit that directs air from the air chamber into the combustion chamber; and, a check valve spring coupled to a check valve located between the air chamber and the combustion chamber to allow pressured air to flow from air chamber into combustion chamber while preventing a back flow of gases and propellants from the combustion chamber into air chamber.

18. The rotary engine of claim 12 further comprising a valve rocker arm that attaches at one end to an exhaust check valve and at a second end to cam lobe to control an opening and closing of the exhaust valve to direct propellants against the piston.

19. The rotary engine of claim 12 further comprising a lifter that controls opening and closing of the valve door, said lifter comprises a gear that is rotated in opposite directions to raise and lower the valve door such that it moves towards and away from the crankshaft to optimize the amount of energy that is directed against the piston.

20. The rotary engine of claim 12 further comprising a vane seal for the piston that is seated between the piston and the wall of the housing that defines the chamber, said vane seal preventing leakage of gases between the piston and the walls of the housing that define the cylinder.

* * * * *